(12) United States Patent
Kanago et al.

(10) Patent No.: US 6,587,671 B1
(45) Date of Patent: Jul. 1, 2003

(54) RF TEST SET WITH CONCURRENT MEASUREMENT ARCHITECTURE

(75) Inventors: Kerwin D. Kanago, Veradale, WA (US); David L. Platt, Veradale, WA (US); James B. Summers, Spokane, WA (US); Melvin D. Humpherys, Spokane, WA (US); Richard P. Ryan, Spokane, WA (US); Matthew Johnson, Half Moon Bay, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/322,505

(22) Filed: May 28, 1999

(51) Int. Cl.[7] .................................................. H04Q 7/34
(52) U.S. Cl. ........................ 455/67.1; 455/423; 455/424; 455/425; 455/115; 379/21; 370/241; 370/253; 324/158.1
(58) Field of Search ............................. 455/67.1, 423, 455/115, 226.1, 403, 424, 425, 422, 407; 379/21; 370/241, 253, 252; 324/158.1

(56) References Cited

U.S. PATENT DOCUMENTS

| 5,420,941 | A | | 5/1995 | Capo et al. ................. 382/302 |
|---|---|---|---|---|
| 5,504,800 | A | * | 4/1996 | Yeshusha et al. ........... 455/67.1 |
| 5,656,929 | A | | 8/1997 | Humphreys ................... 324/95 |
| 5,663,638 | A | | 9/1997 | Humphreys ................... 324/95 |
| 5,668,510 | A | | 9/1997 | Humpherys ................. 333/127 |
| 5,682,238 | A | | 10/1997 | Levitt et al. ................. 356/345 |
| 5,826,072 | A | | 10/1998 | Knapp et al. ............... 395/567 |
| 5,907,797 | A | * | 5/1999 | Hanatatsu et al. ............ 455/63 |
| 6,112,067 | A | * | 8/2000 | Seike et al. ................. 455/67.1 |
| 6,126,601 | A | * | 10/2000 | Gilling ........................ 600/440 |

* cited by examiner

*Primary Examiner*—William Trost
*Assistant Examiner*—Keith Ferguson

(57) ABSTRACT

An RF test set having a concurrent measurement architecture is provided. The RF test set is adapted for testing an RF communications device such as a cellular phone according to a set of RF tests. An RF source and an RF receiver are used to communicate with the cellular phone in order to perform the call processing operations to control the cellular phone while performing parametric measurements according to the RF tests. Concurrent measurements allow operation of concurrent measurement processes and call processing operations to take place in the RF test set in order to decrease the time required for each RF test and to increase measurement throughput of the RF test set.

16 Claims, 5 Drawing Sheets

RF TEST SET WITH CONCURRENT MEASUREMENT ARCHITECTURE

BACKGROUND OF THE INVENTION

This invention relates to cellular telephone communications test and in particular to a radio frequency (RF) test set having a concurrent measurement architecture.

RF devices include a wide variety of two way radios, pagers, satellite terminals, wireless local area networks (LANs) and other communications devices that use radio or lightwave frequencies. All such RF devices share a common problem of relatively complex, slow, and expensive tests that are typically performed during the manufacturing and maintenance of the equipment. The high demand for cellular telephones, coupled with the relatively high complexity and abundance of different cellular protocols, creates a particular need for an RF test set that can provide faster, more adaptable measurements.

The demand for cellular telephones worldwide has continued to increase dramatically and now exceeds 200 million subscribers. Fueling the demand are deregulation and privatization of the cellular telephone industry that have allowed for increased competition and a wider choice of services for the consumer. Developing countries that lack a modern telecommunications infrastructure are adopting cellular telephones at a rapid pace. At the same time, the existing base of subscribers are updating their cellular phones to take advantage of second generation digital cellular services. Multi-mode phones, capable of operating on multiple frequency bands and multiple cellular protocols, are now becoming popular to satisfy the coverage needs of roaming subscribers.

To meet the rising demand for cellular telephones, manufacturers have increased the number and capacity of their production lines. A critical process in any production line is the testing of each cellular phone which is typically performed by an RF test set. An RF test set is a measurement instrument that includes various stimulus and response components that operate both to control the operation of the cellular phone and to perform parametric measurements of the cellular phone according to a selected set of radio tests. Stimulus components of the RF test set generally include an RF signal source and an audio source. A response measurement component of the RF test set is generally an RF receiver in the form of a down-converter and demodulator. The RF test set must generally be capable of emulating a cellular base station using established cellular protocols and performing radio tests of the cellular telephone.

FIG. 1 illustrates the process of assembling and testing a cellular phone in a typical production line. A cellular phone 16 is tested at different points in the production process. The printed circuit assembly (PCA) is tested in a pre-test operation 10 for functionality after loading the electronic components. After being fully assembled, a series of final tests are performed to test the cellular telephone 16 for functionality. The proper operation of the cellular phone display is verified during a visual operation 12 and the proper operation of the keypad is verified during a keypad operation 14. The visual operation 12 and keypad operation 14 can be performed manually or by using automated systems.

A series of radio tests are then conducted using an RF test set 20 which simulates a cellular base station to communicate with the cellular phone 16 while measuring its performance against specification limits during a selected set of radio tests 18. Because the radio tests 18 tend to be slow and complex, the production line capacity may be limited by the throughput of the RF test set 20.

Prior art RF test sets such as the HP 8922 perform radio tests in a sequential fashion, one test followed by another test, until the selected set of radio tests 18 is completed. Radio tests for cellular telephones traditionally involve complex parametric measurements for both the transmitter and the receiver. Transmitter tests typically include modulation accuracy, transmitter power, output RF spectrum, and power versus time. Receiver tests may include receive sensitivity and bit error rate. Each radio test requires conducting call processing operations to control the cellular phone 16 using cellular protocols, then making measurements of the parameters of interest according to each radio test, and finally processing the measurements to obtain the results for each radio test.

Using sequential testing methods according to the prior art, the total time for the selected set of radio tests 18 for each cellular phone 16 is on the order of 35 to 90 seconds. Because this total time can limit the throughput of the production line, the traditional solution has been to purchase multiple RF test sets to add test capacity which substantially adds to the manufacturer's production line cost and complexity. It would therefore be desirable to provide an RF test set with a concurrent measurement architecture to obtain increased measurement throughput and faster radio test times.

SUMMARY OF THE INVENTION

In accordance with the present invention, an RF test set having a concurrent measurement architecture is provided. The RF test set is adapted for testing an RF device such as a cellular phone according to a set of RF tests. An RF source and an RF receiver are used to communicate with the cellular phone in order to perform the call processing operations to control the cellular phone while performing concurrent measurements according to the RF tests. Concurrent measurements allow simultaneous operation of concurrent measurement processes and call processing operations to take place in the RF test set in order to decrease the total time required for each RF test and to increase measurement throughput of the RF test set.

The measurement architecture of the RF test set is organized into three layers; a user interface layer, a virtual instrument layer, and a hardware interface layer. The user interface layer may contain a manual user interface to allow for manual operation of the RF test set via a display and front panel controls. A remote user interface allowing for connection of the RF test set to a computer allows for automating the radio tests.

The virtual instrument layer contains a set of virtual instruments each of which define a particular call processing or measurement function. Each virtual instrument may be invoked according to the requirements of particular radio test. In response, the virtual instrument calls upon the hardware resources such as RF sources and receivers to interact with the cellular phone and obtain measurement data. Multiple virtual instruments may be executing concurrently, along with multiple RF tests and call processing operations, to provide for substantial gains in measurement throughput.

One feature of the present invention is to provide an RF test set capable of concurrent measurements.

A further feature of the present invention is to provide an RF test set with a concurrent measurement architecture.

Another feature of the present invention is to provide an RF test set having concurrent measurements capable of simultaneous transmitter and receiver tests.

Another feature of the present invention is to provide an RF test set capable of conducting concurrent measurements according to a set of virtual instruments.

Other features, attainments, and advantages will become apparent to those skilled in the art upon a reading of the following description when taken in conjunction with the accompanying drawings.

DETAILED DESCRIPTION OF THE INVENTION

Figure 1:
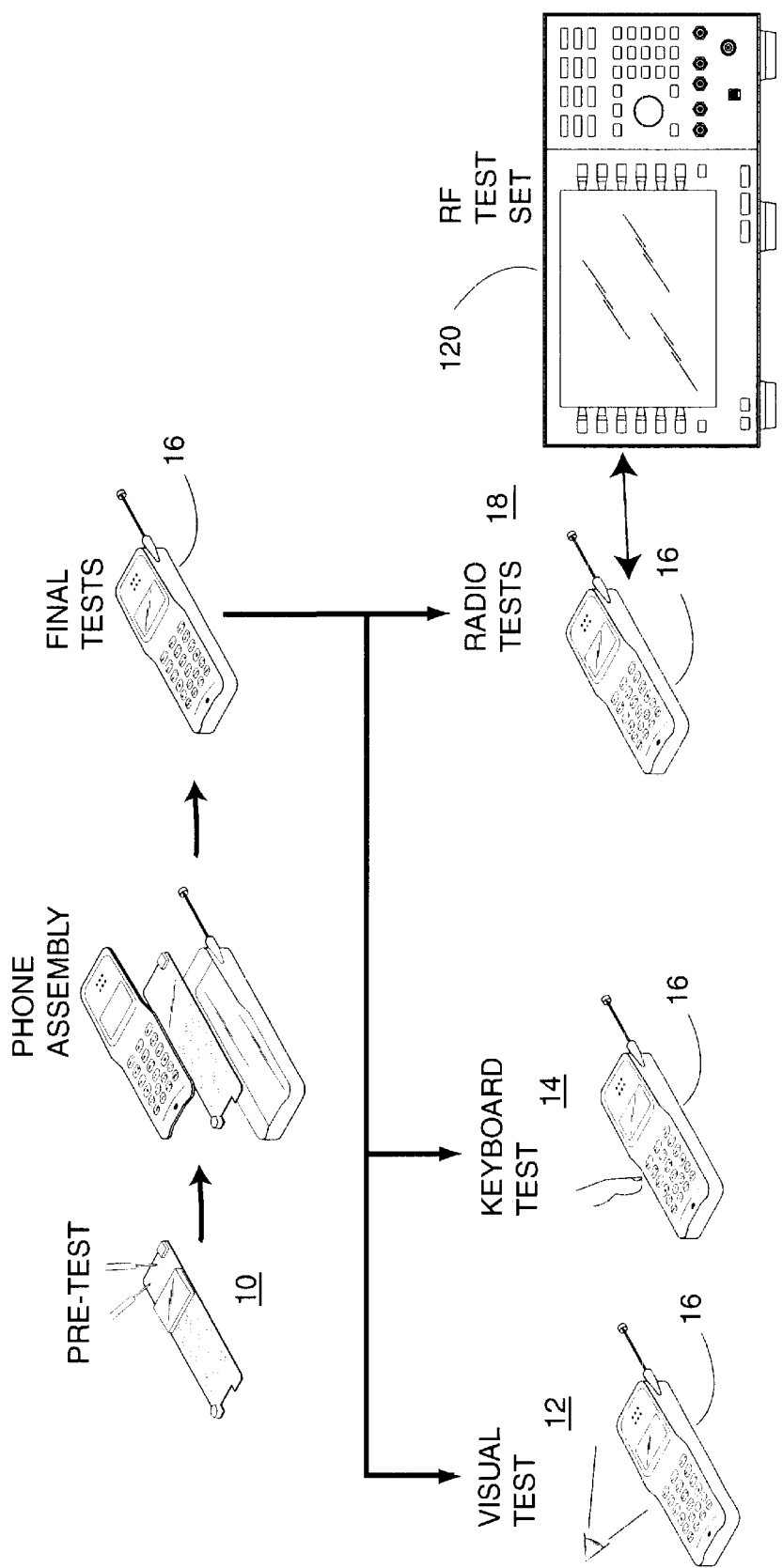
FIG. 1 is an illustration of the tests that are typically performed during the production process for cellular phones.
Figure 2:
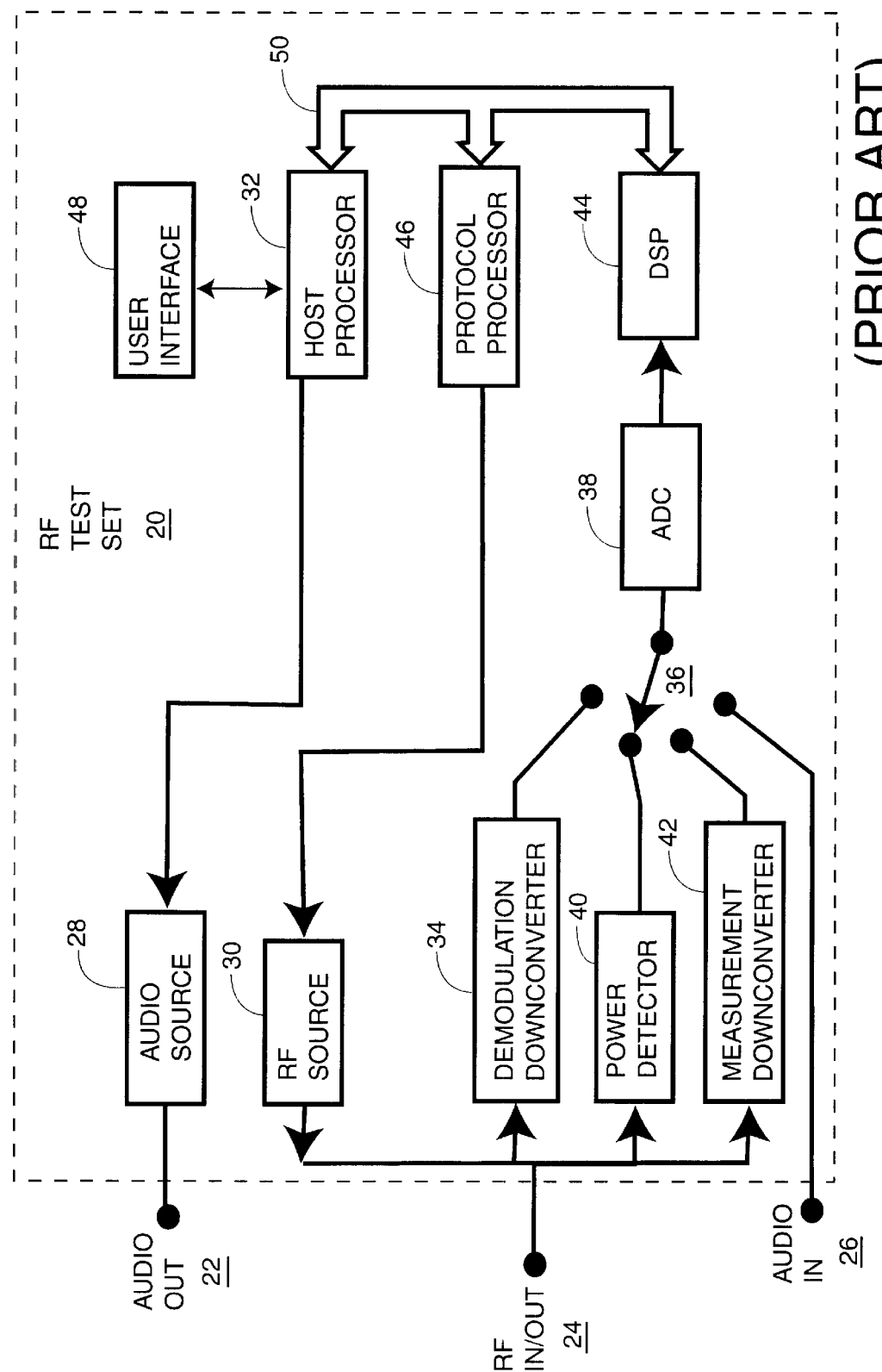
FIG. 2 is a block diagram of an RF test set according to the prior art.

In FIG. 2, there is shown a block diagram of the RF test set 20 according to the prior art. Audio out port 22, RF in/out port 24, and audio in port 26 are ports for connecting signals to and from the cellular phone 16. Such connections are typically made through a test jig (not shown) into which the cellular phone 16 is placed by an operator to conduct the set of radio tests 18. The test jig typically provides connections via a test connector (not shown) to the cellular phone 16. An audio source 28 connected to the audio out port 22 generates audio test signals which may be used to test the audio portion of the cellular phone 16 which is in turn coupled to the audio in port 26 and ADC 156 for conversion to digital samples.

An RF source 30 connected to the RF in/out port 24 generates an RF signal in the cellular band of the cellular telephone which is typically in the frequency range of 800 MegaHertz (MHz), 1.8 GigaHertz (GHz), or 1.9 GHz depending on the cellular standard. The RF source 30 and the audio source 28 are controlled by a host processor 32. The RF source 30 provides RF signals that emulate a cellular base station to control the operation of the cellular phone 16 during the set of radio tests 18.

A demodulation downconverter 34 operates as an RF receiver to downconvert the RF signal from the cellular phone 16 to a low frequency "baseband" signal containing link information that can then be demodulated. The baseband signal is similar to an intermediate frequency (IF) signal containing signal information prior to the demodulation function performed by a digital signal processor (DSP) 44. The link information, now in the form of a baseband signal, is first provided to a switch 36 to be selectively routed to an ADC 38 for conversion to digital samples. A power detector 40 provides for power measurements of the RF signal received from the cellular phone 16 that are selectively provided to the ADC 38 by the switch 36. A measurement downconverter 42 operates as an RF receiver to downconvert the RF signal from the cellular phone 16 to a baseband signal independently from the demodulation downconverter 34 in order to make parametric measurements of the RF signal which are also selectively provided to the ADC 38 by the switch 36. Since the RF test set 20 does not have a concurrent measurement architecture, the functions of the demodulation downconverter 34 and the measurement downconverter 42 could be combined into a single downconverter. The audio in port 26 receives audio signals that are also selectively provided via the switch 36 to the ADC 38.

The digital samples from the ADC 38 are provided to the DSP 44 which operates to extract and demodulate desired information from the digital samples representing the information contained in the baseband signal. The information may also be passed on from the DSP 44 to the protocol processor 46 which maintains a protocol stack used in the base station emulation. The overall operation of the instrument is controlled by the host processor 32 which may be implemented using a general purpose microprocessor or an embedded controller. The host processor 32 communicates with a user interface 48 which may be a manual user interface such as a front panel display or a remote user interface coupled to a personal computer or workstation via an interface bus or local area network.

The RF test set 20 as just described necessarily performs the RF tests in a serial fashion, with only one radio test or call processing operation at a time. In each radio test, one set of measurements at a time are collected, processed, and the results sent to the user interface 48. Because the time required to perform each radio test is cumulative, the total amount of time required to complete the selected set of radio tests 18 may get excessively long thereby limiting measurement throughput of the RF test set 20 according to the prior art.

Figure 3:
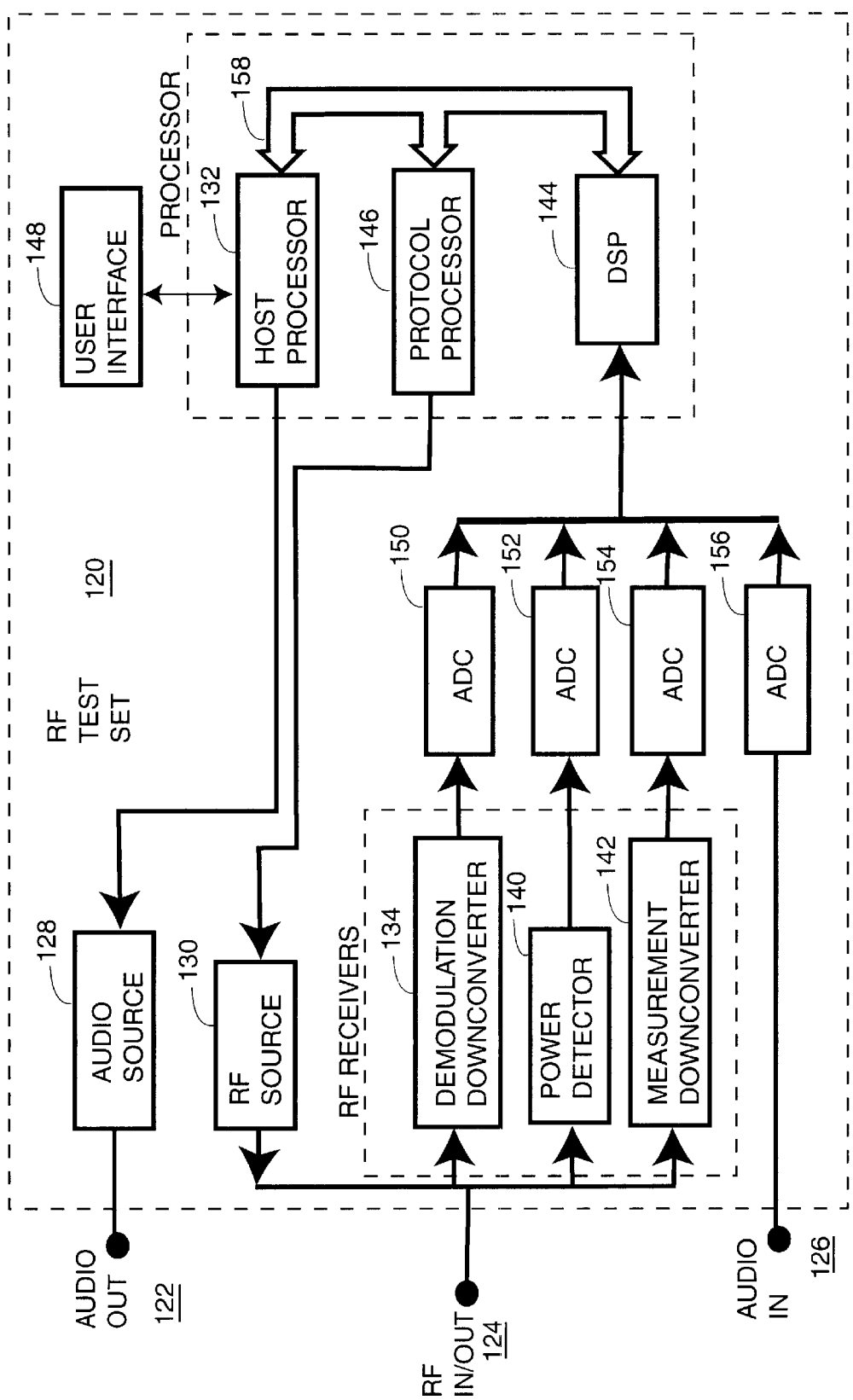
FIG. 3 is a block diagram of an RF test set according to the present invention.

In FIG. 3, there is shown a block diagram of an RF test set 120 according to the present invention. Audio out port 122, RF in/out port 124, and audio in port 126 are ports for connecting signals to and from the cellular phone 16 now in final test. Such connections are typically made through a test jig in which the cellular phone 16 is placed by an operator as a part of the final test. The test jig typically provides connections via a test connector (not shown) to the cellular phone 16. An audio source 128 connected to the audio out port 122 generates audio test signals which may be used to test the audio portion of the cellular phone 16.

An RF source 130 connected to the RF in/out Port 124 generates an RF signal typically in one of the frequency ranges of 800 MegaHertz (MHz), 1.8 GigaHertz (GHz), or 1.9 GHz depending on the cellular standard that the cellular telephone 16 is operating under. Newer multimode phones may operate in two or three different frequency ranges according to their ability to operate under different cellular standards. The RF source 130 and the audio source 128 are controlled by a host processor 132. The RF source 130, in conjunction with a protocol processor 146, emulates a cellular base station to control the operation of the cellular phone 16 during the radio tests as explained in more detail below.

A demodulation downconverter 134 operates to downconvert the RF signal from the cellular phone 16 to a baseband signal containing link information that can then be demodulated. The link information, now in the form of a baseband signal, is provided to an ADC 150 for conversion in digital samples. A power detector 140 provides for parametric measurements of the RF signal received from the cellular phone 16 in terms of signal power. The power measurements are provided to an ADC 152 for conversion into digital samples.

A measurement downconverter 142 operates as an RF receiver to downconvert the RF signal from the cellular phone 16 to a baseband signal independently from the demodulation downconverter 134 in order to make measurements. The measurement signal is provided to an ADC 154 for conversion to digital samples. The demodulation downconverter 134, power detector 140, and measurement downconverter 142 each operate as RF receivers which have been adapted for specialized measurement tasks. A general purpose RF receiver could be substituted for any or all of the separate components including each of the demodulation downconverter 134, power detector 140, and measurement downconverter 142 depending on the performance requirements of the application.

The digital samples from the ADCs 150–56 are provided to a digital signal processor (DSP) 144 which operates to extract desired information from the digital samples representing the information contained in the link information, power measurements or baseband signal. The ADCs 150–56 can operate simultaneously, asynchronously, and at different sample rates to provide measurement samples to the DSP 144.

The link information may be passed on from the DSP 144 to the protocol processor 146 via a bus 158. The protocol processor 146 is a special purpose microprocessor which maintains a protocol stack used in the base station emulation and call processing operations. The DSP 144 may pass on measurement information directly to the host processor 132 via the bus 158. The overall operation of the instrument is controlled by the host processor 132 which may be implemented using a general purpose microprocessor or an embedded controller. Data may be shared among the DSP 144, protocol processor 146 and the host processor 132 as it is being processed to allow for parallel operation. Pipelining, in which the data is passed along in stages between the different processors in a sequential fashion during processing, may be employed to increase throughput for selected types of measurements.

The host processor 132 communicates with a user interface 148. The user interface 148 may be a manual user interface such as a front panel display or a remote user interface coupled to a personal computer or workstation via an interface bus or local area network.

The RF test set 120 as just described may perform concurrent measurements, radio tests, and call processing operations in order to obtain substantially improved throughput for the radio tests 18. Using the concurrent measurement method according to the present invention, multiple transmitter and receiver measurements may be collected at the same time, with the digital samples provided from the ADCs 150–56 in an interleaved fashion to the DSP 144. A real-time operating system excecuted by the host processor 132 allows multiple measurement processes and call processing operations to be running at the same time. Dependencies between the concurrent processes can be defined in order to ensure coordination where it is needed. For example, the proper completion of a call set up operation can be defined as a dependency which must be completed before a transmitter measurement process is started. The operation of the concurrent measurement processes executed by the host processor 132 in conjunction with the protocol processor 146 and DSP 144 is discussed in more detail below.

The host processor 132 operates in parallel with the protocol processor 146 and the DSP 144 in order to gain the speed advantages and to allow the use of special purpose processors to efficiently perform specific tasks such as DSP or protocol processing. Alternatively, a single general purpose processor could be substituted to perform all of the tasks performed by the separate processors by trading off measurement throughput versus component cost and system complexity. Alternatively, multiple DSP or host processors could also be employed to further enhance concurrency.

Figure 4:
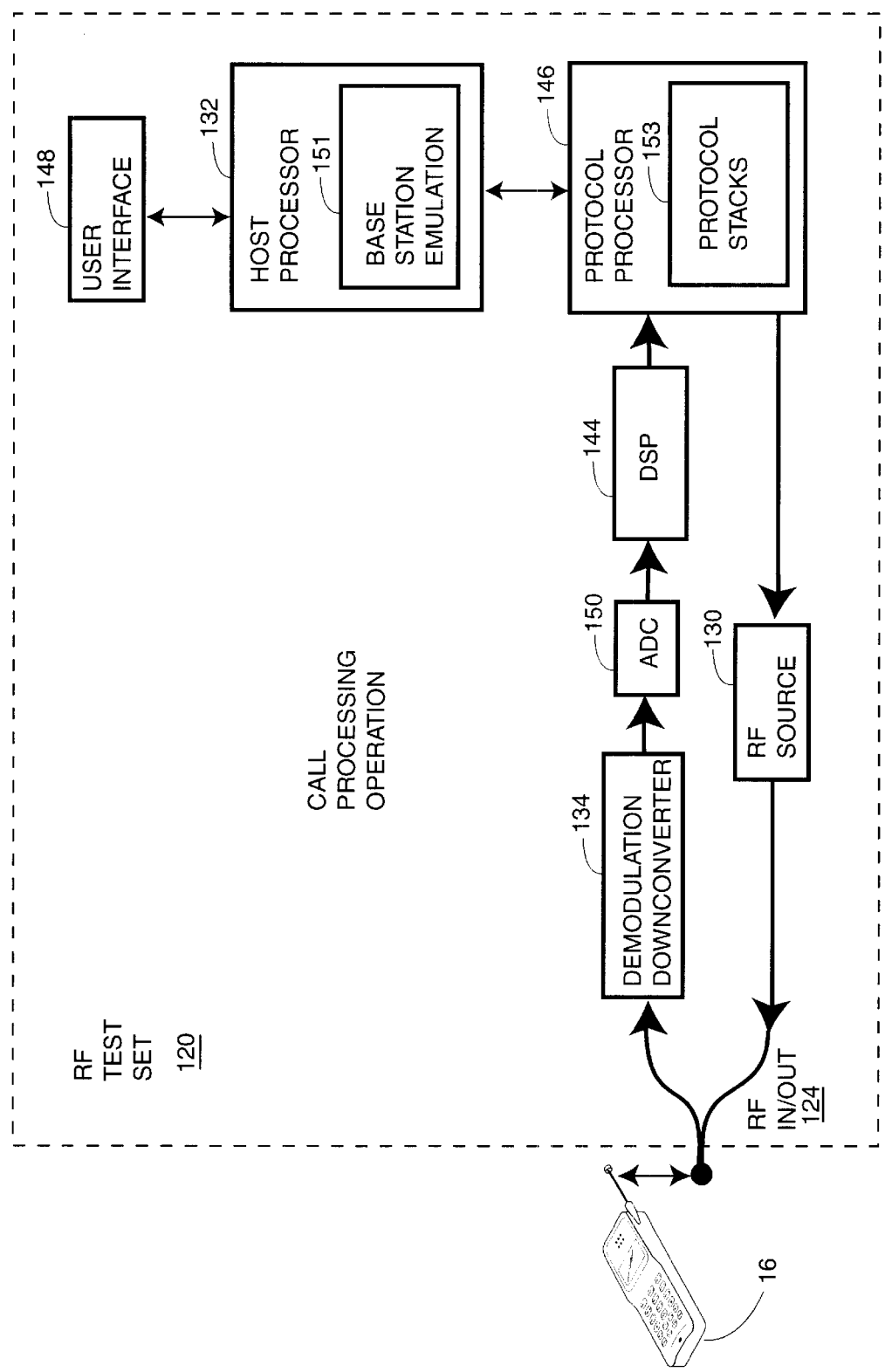
FIG. 4 is a block diagram of a portion of the RF test set that handles a call processing operation according to the present invention.

FIG. 4 is a block diagram showing the flow of information that takes place among portions of the RF test set 120 to handle a typical call processing operation in conjunction with the cellular phone 16. The RF test set 120 communicates with the cellular phone 16 via the RF in/out port 124 which directionally couples the signal to the demodulation downconverter 134 and from the RF source 130. The demodulation downconverter 134 operates as an RF receiver to downconvert the RF signal from the cellular phone 16 to a low frequency baseband signal containing link information that can then be demodulated.

The link information, now in the form of a baseband signal, is provided to the ADC 150 for conversion to digital samples. The digital samples are provided to the DSP 144 which may perform digital filtering or other signal processing operations on the digital samples before passing them along to the protocol processor 146 which operates on the digital samples as protocol data. Protocol data may be transmitted back to the cellular phone 16 by modulating the RF source 130.

The host processor 132 contains a process 151 for managing the link between the RF test set 120 and the cellular phone 16 labeled Base Station Emulation. The process 151 for base station emulation is a virtual instrument that calls on the RF source and receivers of the RF test set 120 to emulate a cellular base station according to the protocol used by the cellular phone 16. The operation of virtual instruments is explained in greater detail below. As an example, if the cellular phone 16 operates according to the GSM protocol, the process 151 would contain a set of protocols that would allow the RF test set 120 to emulate a GSM base station. The protocol processor 146 contains protocol stacks 153 that operate to emulate the cellular base station according to the process 151. The user interface 148 may be used to set parameters in the process 151 or other processes running in the host processor 132 may call on the process 151 in order to control the operation of the cellular phone 16.

Figure 5:
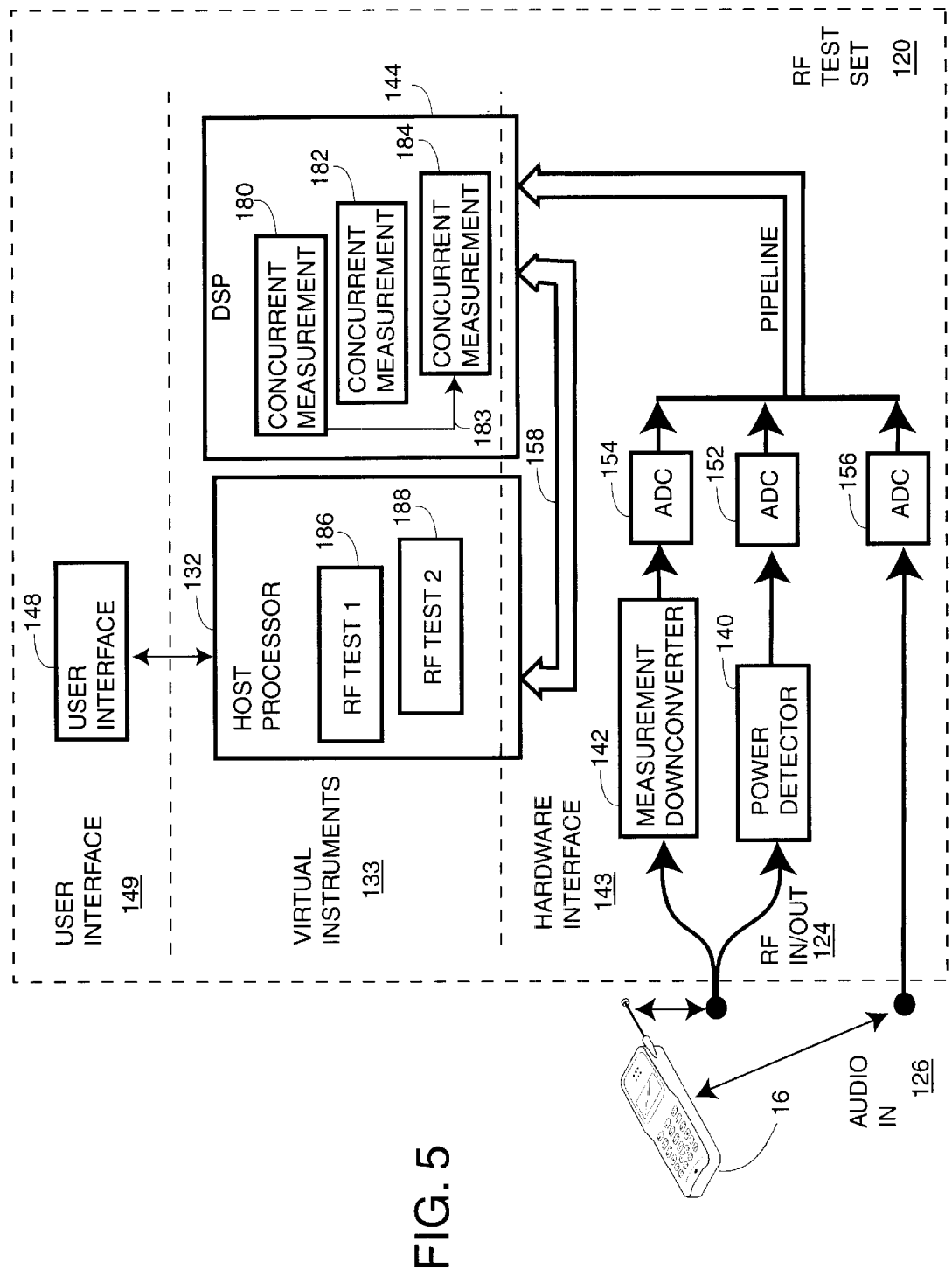
FIG. 5 is a block diagram of a portion of the RF test set forming virtual instruments to perform concurrent measurements according to the present invention.

FIG. 5 is a block diagram showing the flow of information that takes place among portions of the RF test set 120 to handle concurrent measurements. The operation shown in FIG. 5 can occur concurrently with the call processing operation shown in FIG. 4. The RF test set 120 communicates with the cellular phone 16 via the RF in/out port 124 which directionally couples the signal to the measurement downconverter 142 and the power detector 140. The measurement downconverter 142 operates as an RF receiver to downconvert the RF signal from the cellular phone 16 to a baseband signal in order to make parametric measurements.

The power detector 140 provides power measurements of the RF signal with sufficient accuracy and resolution for the application requirements. The ADCs 152 and 154 convert the measurements from the measurement downconverter 142 and power detector 140 to digital samples which are in turn provided to the DSP 144. Audio signals may be provided to the audio in port 126 for conversion to digital samples by the ADC 156.

The digital samples from the ADCs 152–56 are provided to the DSP 144 which may perform digital filtering or other signal processing operations on the digital samples before passing them along to the host processor 132. The digital samples may be interleaved among each other through the use of multiplex techniques or entire series of digital samples may be sent as an entire block of measurements in a burst mode, depending on the measurement requirements. Because the DSP 144, host processor 132, and protocol processor 146 are operating concurrently, digital samples and measurement data may be passed among them using pipeline techniques. Pipeline techniques are well known in the art for communicating data among different processes in a serial fashion to improve throughput.

In the DSP 144, a number of measurement processes may be executing concurrently, such as processes 180, 182, and 184 labeled MEAS 1, MEAS 2, and MEAS 3 respectively which operate on the digital samples from the ADCs 150–56.

The processes 180, 182, and 184 may include various digital signal processing functions such as filtering, demodulation, or correlation which are performed on the digital samples.

The host processor 132, in addition to executing the base station emulation virtual instrument shown as process 151 in FIG. 4, may also be executing other virtual instruments such processes 186 and 188 labeled RF TEST 1 and RF TEST 2 respectively. The processes 186 and 188 may operate to invoke various measurement processes such as the processes 180–84 in the DSP 144 depending on the type of measurement to be performed. The RF TEST 1 may be a receiver test while the RF TEST 2 may be a transmitter test, for example, and RF TEST 1 and 2 may be operating concurrently in order to provide substantial advantages in measurement throughput and speed. Dependencies between the various processes 151 and 180–88 may be defined so that conflicts and competition for system resources may be avoided.

The RF test set 120 is logically divided into different levels which include an user interface layer 149, a virtual instrument layer 133, and a hardware interface layer 143. In the user interface layer 149, the user interface 148 may be a local user interface including front panel displays, knobs, and buttons that allow the user to operate the RF test set 120 manually. Alternatively, the user interface 148 may be a remote user interface to a computer or workstation via a remote interface bus such as GPIB or RS-232C as well as a local area network (LAN) in order to automate the radio tests. Commands and data may be remotely exchanged between the computer and RF test set 120 via the remote interface bus.

The virtual instrument layer 133 is not visible from the user interface layer 149 although the virtual instruments used to conduct various tests may be called when the user requests a radio test via the user interface 148. The processes 186–88, along with the process 151 for base station emulation, are virtual instruments that define measurements or call processing operations. Virtual instruments may be thought of as software objects similar to those used in object oriented programs to operate on data in predefined ways. The advantages of object oriented programming in creating virtual instruments such as defining classes, use of inheritance and encapsulation as applied to test and measurement are discussed in "Object-Oriented Test & Measurement Software Development in C++", Lee Atchison, Prentice-Hall Inc., 1997, ISBN 0-13-227950-0. Such virtual instruments may be readily invoked, duplicated, and linked according to the requests received from the user interface layer 149. Other programming techniques such as structured programming may also be used in creating virtual instruments.

Virtual instruments call upon hardware resources in the hardware interface layer to obtain the measurement information needed for a particular measurement. Because the hardware resources are shared among any number of virtual instruments competing to make different measurements, hardware resource may be allocated according a priority scheme such as a first-in first out (FIFO) order, or any other of a variety of arbitration schemes that are chosen to maximize measurement throughput and reliability of the RF tests.

The hardware interface layer 143 contains the hardware resources which are the physical measurement components including the measurement downconverter 142, power detector 140, and ADCs 152–156 that operate to provide digital data to the DSP 144. The hardware resources of the hardware interface layer 143 are known to the virtual instrument layer 133 and are called upon by the various virtual instruments to make the measurements and provide the measurement data back to the virtual instruments layer 133 according to the processes that are running. To support concurrent measurements, more than one virtual instrument may require the use of the system resources in the hardware interface 143 such as to collect measurement data. Dependencies and communications among the virtual instruments may be built into the virtual instruments layer 143 to allow for the most efficient use of the system resources.

For example, RF TEST 1, the receiver measurement running as process 186, conducts a receiver test by spawning concurrent measurement 182 in the DSP 144. The concurrent measurement 182 collects measurements from the ADC 156 which receives audio information from the receiver in the cellular phone 16. Concurrently with RF TEST 1, RF TEST 2, the transmitter measurement running as process 188, may spawn concurrent measurement 180 in the DSP 144 which collects power measurement data from the power detector 140 and concurrent measurement 184 which collects phase and frequency measurement data from the measurement downconverter 142. The processes 151, 186 and 188 comprise a set of virtual instruments which are invoked as needed to accomplish various measurement and call processing functions. Additional virtual instruments may be defined and added to the set of virtual instruments as needed to accomplish specific measurement functions.

The user interface 148 may then call upon process 151, the base station emulation virtual instrument, to contact the cellular phone 16 and have it change its transmitter power level to another desired level during the RF test. The concurrent measurement 180 may have a built in dependency which requires it to delay beginning the power measurement until the process 151 is finished communicating with the cellular phone 16 and the cellular phone 16 has complied with the request to change its power level. A dependency 183 may be defined between the concurrent measurements 180 and 184 which may compete for the same system resource such as the power detector 140. The dependency 183 can be set up so that concurrent measurement 180 completes acquiring data and begins processing its data before concurrent process 184 begins acquiring data from the power detector 140.

A further dependency to both concurrent measurements 180 and 184 may be defined to allow for a settling time of the system resources such as the power detector 140 or the measurement downconverter 142 in order to ensure reliable power measurements. The dependency 183 may be implemented by having the virtual instruments publish various status information which are subscribed to by other virtual instruments which then wait for the status information to become a predetermined value.

The measurements from the power detector 140 through the ADC 152 and the audio measurements from the ADC 156 may be interleaved on their way to the DSP 144 so that concurrent measurements 180, 182 and 184 may acquire and process data at the same time. In this way, the desired power measurement may be collected for the RF TEST 2 transmitter test by accessing the appropriate system resources using the concurrent measurements 180 and 184 working in conjunction with the base station emulation of the process 151 to control the operation of the cellular phone 16.

The above example illustrates some key features of the present invention. Measurement processes can operate concurrently with each other and with call processing operations. Dependencies between the various virtual instruments can be defined in order to reliably conduct concurrent call processing and measurement operations. The concurrency between processes can take place across multiple processors such as the host processor 132 and the DSP 144 in order to further increase measurement throughput.

It will be obvious to those having ordinary skill in the art that many changes may be made in the details of the above-described preferred embodiments of the invention without departing from the spirit of the invention in its broader aspects. For example, the concurrent measurement capability described above may be readily adapted for use with other types of measurement instruments that typically perform multiple types of measurements. The number and types of virtual instruments as well as the precise configuration of the system resources in the hardware interface 143 may be readily varied to suit the application. The RF test set may be readily adapted for testing lightwave communications devices using suitable optical sources and and receivers. Therefore, the scope of the present invention should be determined by the following claims.

What we claim as our invention is:

1. A method of testing a radio-frequency (RF) communications device, said method comprising the steps of:

receiving an RF signal from said device;

converting said RF signal into at least two analog signals;

concurrently converting said analog signals into respective digital data streams; and determining at least one measurement from each of said data streams.

2. A method as recited in claim 1 further comprising a step of interleaving said digital data streams prior to said determining step.

3. A method as recited in claim 1 further comprising a step of executing at least one virtual instrument for each measurement determined at said determining step, said step of executing at least one virtual instrument being initiated prior to said receiving step.

4. A method as recited in claim 3 wherein said executing step involves executing at least a first virtual instrument and a second virtual instrument, said second virtual instrument being subject to a dependency on said first virtual instrument.

5. A system for testing a radio-frequency (RF) communications device, said system comprising:

a receiver for receiving an RF signal from said device;

a converter for converting said RF signal into at least two analog signals;

analog-to-digital converter means for concurrently converting said analog signals into respective digital data streams; and data processing means for determining at least one measurement from each of said data streams.

6. A system as recited in claim 5 wherein said analog-to-digital converter means interleaves said digital data streams.

7. A system as recited in claim 5 wherein said data processing means executes at least one virtual instrument for each measurement determined by said data processing means.

8. A system as recited in claim 7 wherein said data processing means executes at least a first virtual instrument and a second virtual instrument, said second virtual instrument being subject to a dependency on said first virtual instrument.

9. A method of testing a radio-frequency (RF) communications device, said method comprising the steps of:

receiving an RF signal and an audio signal from said device;

concurrently converting said RF signal and said audio signal into respective digital data streams; and determining at least one measurement from each of said data streams.

10. A method as recited in claim 9 further comprising a step of interleaving said digital data streams prior to said determining step.

11. A method as recited in claim 9 further comprising a step of executing at least one virtual instrument for each measurement determined at said determining step, said step of executing at least one virtual instrument being initiated prior to said receiving step.

12. A method as recited in claim 11 wherein said executing step involves executing at least a first virtual instrument and a second virtual instrument, said second virtual instrument being subject to a dependency on said first virtual instrument.

13. A system for testing a radio-frequency (RF) communications device, said system comprising:

an RF receiver for receiving an RF signal from said device and converting it to an analog signal;

an audio receiver for receiving an audio signal from said device;

analog-to-digital converter means for concurrently converting said analog signal and said audio signal into respective digital data streams; and data processing means for determining at least one measurement from each of said data streams.

14. A system as recited in claim 13 wherein said analog-to-digital converter means interleaves said digital data streams.

15. A system as recited in claim 13 wherein said data processing means executes at least one virtual instrument for each measurement determined by said data processing means.

16. A system as recited in claim 15 wherein said data processing means executes at least a first virtual instrument and a second virtual instrument, said second virtual instrument being subject to a dependency on said first virtual instrument.

* * * * *